Dec. 8, 1936.  W. H. MARTIN  2,063,257
ELECTRIC WELDER
Filed May 16, 1935  3 Sheets-Sheet 1

Inventor
William H. Martin
By Faust F. Crampton
Attorney

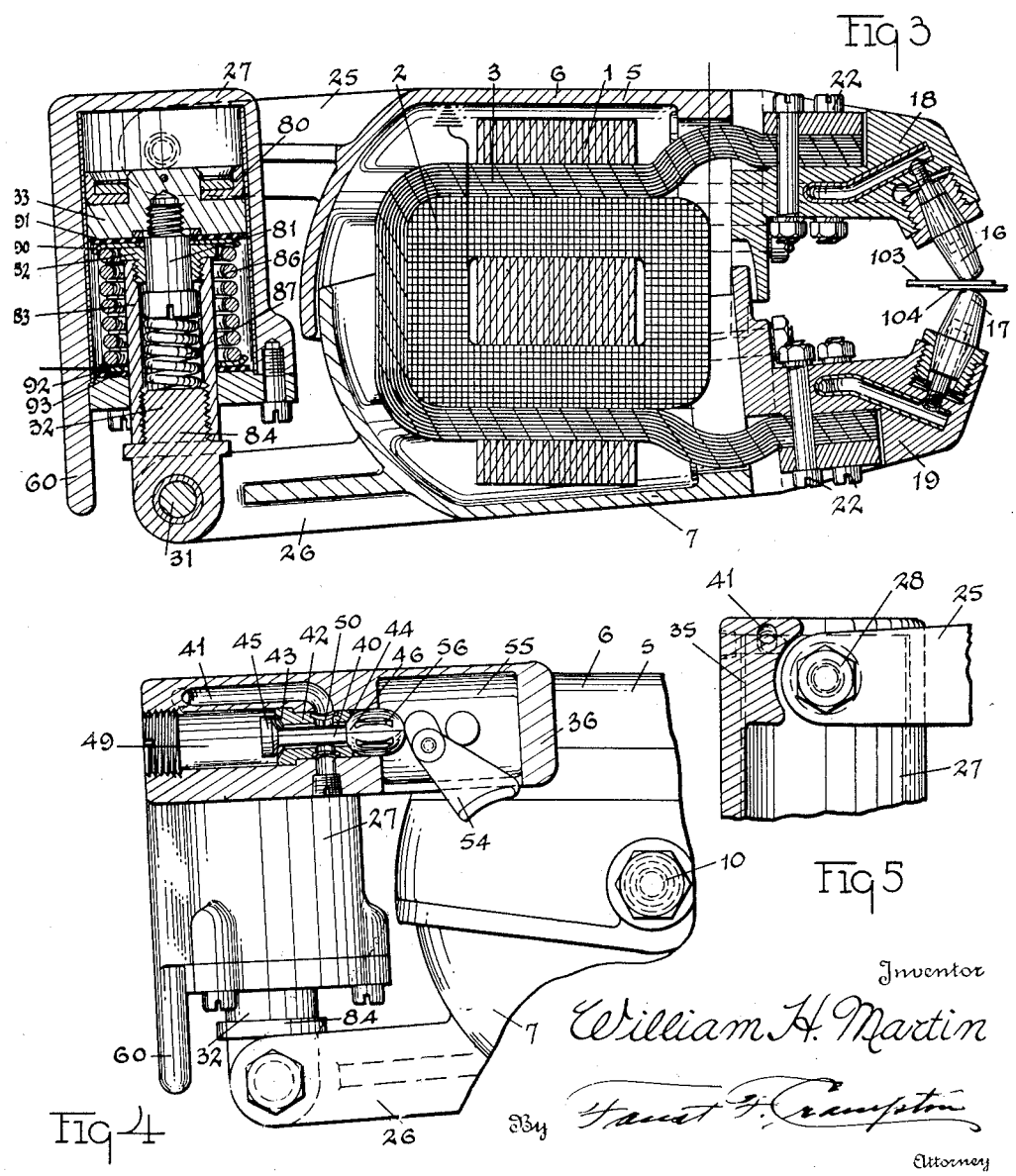

Dec. 8, 1936.                W. H. MARTIN                2,063,257
                             ELECTRIC WELDER
                          Filed May 16, 1935            3 Sheets-Sheet 3

Inventor
William H. Martin
By Faust F. Crampton
                    Attorney

Patented Dec. 8, 1936

2,063,257

UNITED STATES PATENT OFFICE 2,063,257

ELECTRIC WELDER

William H. Martin, Detroit, Mich.

Application May 16, 1935, Serial No. 21,700

2 Claims. (Cl. 219—4)

My invention has for its object to produce a light-weight electric welder that is so constructed that it can be readily manipulated by an operator to produce welds by an induced current from an ordinary commercial line and wherein heavy, large welding current conductors and conductor cooling pipes may be eliminated.

The invention provides a small, lightweight transformer connected to a source of high frequency current and mountable on a hand welder for producing a welding current in an exceedingly short circuit. It eliminates supporting fixtures for welders and renders them adaptable to universal use and application. It eliminates weighty, bulky current conductors for conducting the welding current to the welders from points remote from the work. It eliminates water or air cooling tubes or pipes for maintaining such conductors cool.

The invention also provides a two-part, pivotally connected welder having a transformer-enclosing shell. The invention also provides a transformer located in close proximity to the welding points to prevent terminal voltage drop and a transformer-protecting means for preventing penetration of metal pellets from the welding points.

The invention consists in other features which will appear from the following description and upon the examination of the drawings. Structures containing the invention may partake of different forms and may be varied in their details and still embody the invention. To illustrate a practical application of the invention, I have selected a welder as an example of the various structures that contain the invention and shall describe the selected structure hereinafter, it being understood that certain features of my invention may be used to advantage without a corresponding use of other features of the invention and without departing from the spirit of the invention as presented in the claims. The particular structure selected is shown in the accompanying drawings.

Figure 1:
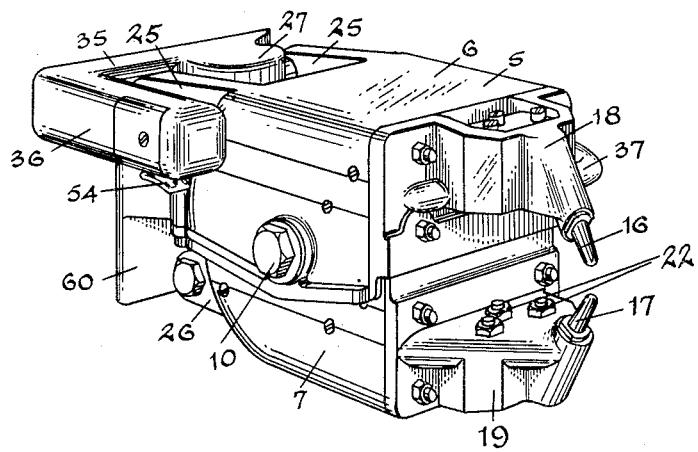
Figure 2:
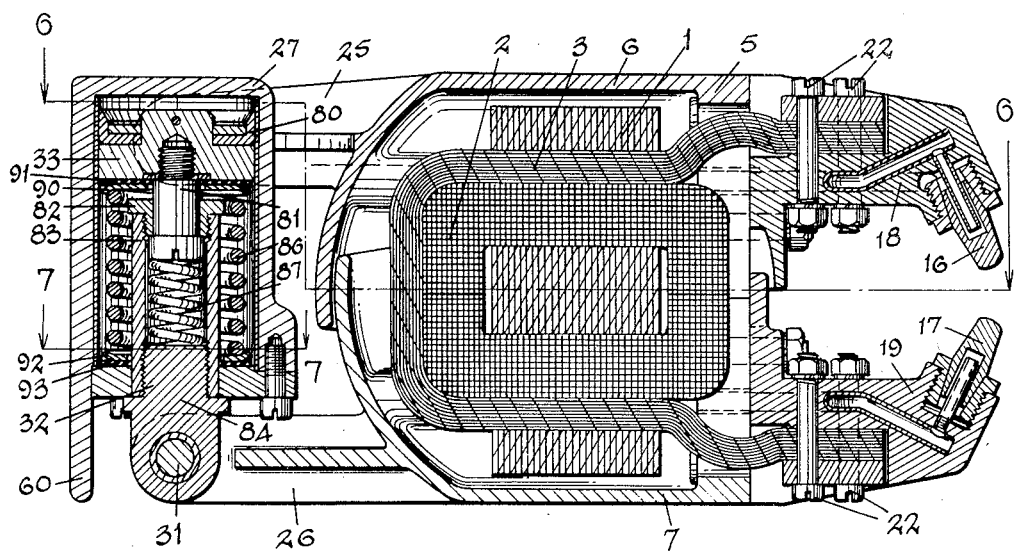
Figure 6:
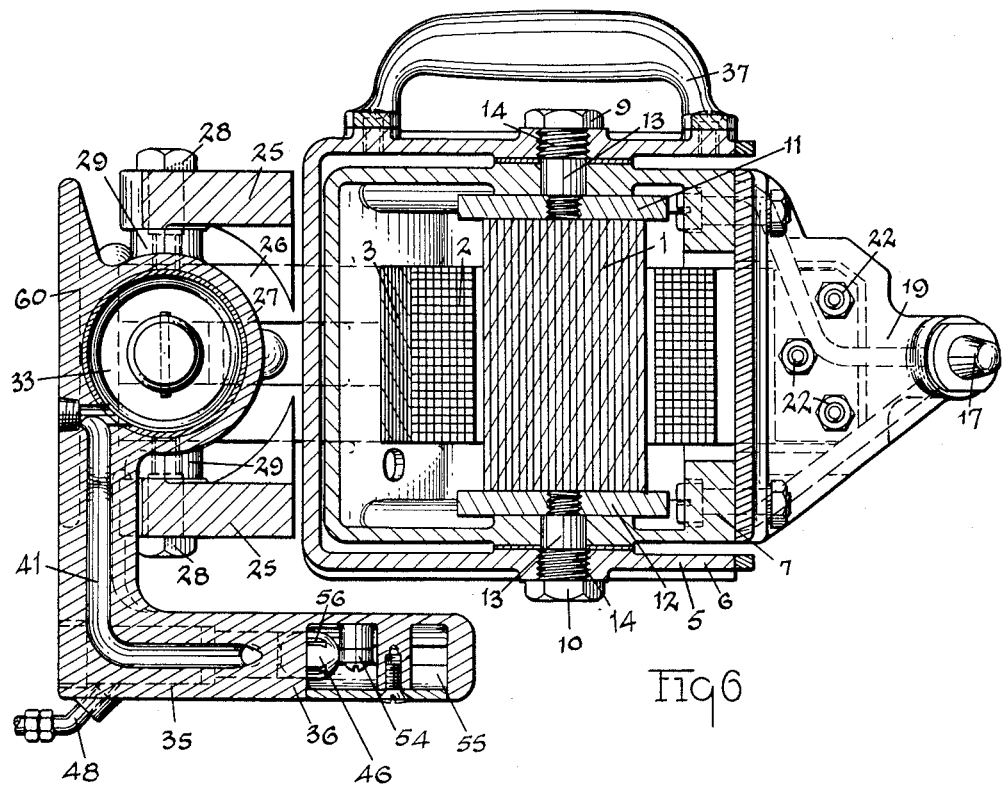
Figure 7:
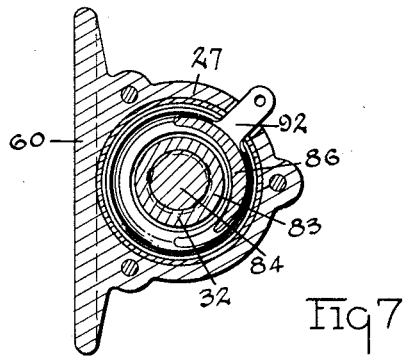

Fig. 1 is a perspective view of the welder. Fig. 2 is a view of a longitudinal section of the welder showing the welder in its open position. Fig. 3 illustrates a view of a section of the welder similar to that shown in Fig. 2, the parts being shown in their closed welding position. Fig. 4 illustrates a view of a section of the valve for controlling the pressure of air supplied to the welder for producing the required welding pressure. Fig. 5 is a view of a section illustrating a pivotal connection between parts of the welder. Fig. 6 is a view of a section taken on the plane of the broken line 6—6 indicated in Fig. 2. Fig. 7 is a view of a section taken on the plane of the line 7—7 indicated in Fig. 2 and illustrates an electric connector.

In the form of welder illustrated in the drawings, a shell-type transformer 1 is mounted on the welder in proximity to one or both of the welding points to reduce voltage drop to a minimum. The transformer is provided with the primary 2 and a secondary 3. Preferably the secondary is formed of a single turn or is U-shaped to greatly increase the ratio of current transformation with a corresponding decrease in the voltage. The secondary is also preferably formed of laminated sheet metal strips whereby one or both ends of the secondary connected to the welding terminals may be readily fixed.

The transformer is preferably enclosed within a shell 5 formed of two parts 6 and 7 that have edge portions that overlap and move relative to each other. The overlapping portions of the parts 6 and 7 are located intermediate the transformer and the welding points and baffle the slugs or pellets or sparks from the points and prevent puncturing of the insulation and short-circuiting of the turns of the primary. The parts 6 and 7 of the shell are pivotally connected together to move relative to each other, the transformer being connected to the pivot members. Thus, the shell of the transformer is located between the sides of the part 7 and secured by means of the studs 9 and 10 threaded into plates 11 and 12 that may be suitably secured to the sides of the shell of the transformer. The pivot pins 9 and 10 have cylindrical parts 13 that are located within suitable bosses or bearings formed on the part 7. The pins have threaded portions 14 that are threaded into the sides of the part 6 and pivotally support the parts 6 and 7 relative to each other.

A welding point is located at one end of each of the parts 6 and 7 of the shell 5, and a pressure means is connected to the remaining ends of the parts to cause the parts to pivot about the pivot pins or studs 9 and 10 to move the welding points and press them against opposite sides of the work. If desired, one of the parts may be provided with a contact which will coact with the welding point connected to the other of the parts to clamp the welding point against the work in order to produce the desired welding pressure and conduct the welding current through the point.

The welding points 16 and 17 are secured in welding-point brackets 18 and 19. The brackets 18 and 19 may be varied as to their shape in order to dispose the welding points 16 and 17 as may be desired with reference to the ends of the parts 6 and 7 of the shell 5. Thus, the welding points 16 and 17 may be disposed at right angles to the major axis of the welder, or they may be inclined with respect to the said axis, as shown in the drawings, or they may be disposed at one side of the central vertical plane when the instrument is located in the position shown in Figs. 1 and 2 and so as to locate the welding points 16 and 17, if desired, in the planes or outside of the planes of the sides of the shell. Thus, the brackets 18 and 19 may be varied so as to locate the welding points 16 and 17 centrally with respect to the sides of the welder or so as to dispose the points near the sides to enable welds to be made in corners or in proximity to fixtures or parts of the work that extend angularly from other parts of the work. This will enable workers to make welding contact where the work is such as to prevent the use of centrally located welding points by reason of some obstruction.

The flexible ends of the secondary 3 are suitably clamped, such as by means of the bolts 22, to the brackets 18 and 19. The flexibility of the ends of the secondary 3 enables movement of the welding points and the parts 6 and 7 of the shell 5 and provides the required cross sectional area of the secondary to enable the flow of the large welding current without production of a material amount of heat.

The ends of the parts 6 and 7 of the shell 5 opposite to that to which the welding points 16 and 17 are connected are provided with arms 25 and 26. A pair of arms 25 is connected to the part 6, and a pair of arms 26 is connected to the part 7. A cylinder 27 is pivotally connected to the ends of the arms 25 by means of the studs 28 threaded into bosses 29 formed on the opposite sides of the cylinder. A pin 31 extends through the ends of the arms 26 and the end of a hollow piston rod 32 and pivotally connects the piston rod 32 and piston 33 to the part 7 of the shell 5.

The cylinder may be connected to a source of supply of air under pressure to move the piston 33 and the piston rod 32 and cause the arms 26 to swing away from the arms 25 and the welding points 16 and 17 to clamp the work. When the pressure has risen to a point such as to produce a required welding pressure, the welding current may be caused to flow in the secondary 3 of the transformer 1 and produce the weld.

The cylinder 27 has a protruding part 35 that extends laterally with respect to the axis of the cylinder and forwardly, parallel to the major axis of the welder and forms a handle part 36 that is conveniently located with respect to the welder to enable the welder to be supported with the aid of a handle 37 located on the opposite side of the welder. The handle 37 is secured to the side wall of the part 6 of the shell and on the side of the welder opposite to that on which the handle 36 is located. Thus, the welder may be readily handled and located by means of the handles 36 and 37.

Inasmuch as the welder is manually controlled, a valve member 40 is conveniently located in the handle 36 to connect the cylinder 27, through a passageway 41, with the source of supply of air under pressure and cause the welding pressure to be produced by the operation of the cylinder and the piston. The valve member 40 is located in a suitable sleeve 42 having seats 43 and 44 formed in its ends. The member 40 has a pair of valve heads 45 and 46 that are adapted to seat upon the seats 43 and 44, respectively. The source of supply of air under pressure may be connected to the protruding part 35 and to a point located at the base of the handle 36 by means of the pipe 48 which communicates with the chamber 49, in which the sleeve 42 is located. The sleeve 42 is provided with openings 50 that communicate with the passageway 41 formed in the protruding part 35. The pressure of the supply of air operates normally to close the connection between the chamber 49 and the passageway 41.

Th valve member 40 is moved against the pressure of the source of supply by means of a trigger member 54 that is preferably disposed at one end of the handle 36 and is located in the chamber 55 formed in the end of the handle. When the trigger 54 is depressed, it pushes against the head 46 to press it against the seat 44 and to move the valve head 45 away from its seat 43. This admits air under pressure into the cylinder, which operates the piston rod 32 to pivotally move the parts 6 and 7 of the welder and clamp the welding points against the work.

The head 46 of the valve member 41 is provided with slots 56, and, upon release of the trigger 54, the pressure of the air in the chamber 49 closes the connection between the source of supply and the cylinder and opens the connection through the passageway 41 to the atmosphere. The pressure within the cylinder is thereby released, and the surplus air is exhausted through the slots 56.

The cylinder 27 is also provided with a laterally extending plate 60 that has a width substantially the same as that of the width of the welder and a length measured vertically substantially the same as that of the height of the welder. It thus forms a broad plate that may be rested against the body of the operator as the welder is held in position by the handles 36 and 37. The transformer of the welder has a weight of twenty-five pounds or less and produces, in connection with the ordinary commercial electric circuit, a 7 kilowatt current—an ample current for the formation of welds by the welder which may have a weight of under thirty pounds. Thus, the invention provides a welder that may be electrically connected by means of small, flexible, primary circuit conductors and eliminates the large and long secondary conductors that render practically impossible manual manipulation of hand welders of the type required to produce welds between metal parts of considerable thickness and body. The invention also reduces the very large voltage drop from the secondary to the welding point.

Inasmuch as the flow of the current through the primary 2 of the transformer 1 is of exceedingly short duration, such as one-fifth of a second or less, there will be but little heat accumulation in the cores and coils of the transformer notwithstanding the increased number of the cycles of the current of the primary circuit of the transformer 1.

In order that the flow of the welding current through the welding points may occur only during the existence of a welding pressure, the flow of the current through the secondary is controlled by the welding pressure. The current flows when the pressure is above the required welding pressure and ceases to flow in advance of the reduction of the pressure to required welding pressure.

The piston 33 is provided with a cup washer 80 located on one side of the piston 33 and a stud 81 located on the other side of the piston. The stud 81 extends through a bushing and electric contact 82 that is threaded into one end of the shell 83. A stud 84 is threaded into the other end of the shell 83. The stud 84 is connected by means of the pin 31 with the arm 26 of the part 7 of the shell 5. The bushing 82 and the stud 84 and the shell 83 form the hollow piston rod 32.

The piston 33 is yieldingly resisted with a progressively increasing resistance by the spring 86 that surrounds the shell 83 and the spring 87 located within the shell 83. The spring 86 is located intermediate the piston 33 and the end of the cylinder, while the spring 87 is located intermediate the head of the stud 81 and the plug 84 forming the outer end of the piston rod 32. The construction enables reduction of the length of the cylinder substantially to that of the width of the transformer core and wall within the limitation of the height of the shell. The resistance of the spring 87 exceeds the resistance of the spring 86, and the resistance of the spring 87 is such that when compressed it will produce a welding pressure between the welding points 16 and 17 in advance of the telescopic movements of the stud 81 relative to the piston 33. When the welding pressure has been reached, further pressure produces the telescopic movement or sliding movement of the piston relative to the piston rod against the resistance of the spring 87 until the piston engages the contact 82. When the pressure is released, the spring 87 first causes separation of the connector 90 from the contact 82. Then the pressure of the spring 86 reduces the clamping pressure of the welding points on the work, and separates the points from the work. The electric connector washer 90 is insulatingly supported by the insulating washer 91 on one side of the piston 33. A similar electric connector washer 92 is similarly supported on the end of the cylinder and insulated by an insulating washer 93. A source of supply of current is connected to the connector washer 92, and the current is conveyed through the spring 86 to the connector washer 90. The electric contact 82 grounds the circuit of the spring and the connector to the body of the welder, to which is also grounded a suitable electric switch for connecting the transformer to the said source when the connector 90 makes contact with the contact 82. Thus there will be produced a weld between the parts of the work, such as between the plates 103 and 104, which requires an exceedingly short interval of time. The operator then releases the trigger 54, which shuts off the pressure from the source of supply to the cylinder and exhausts the surplus air. Immediately, as the pressure reduces, there is first caused a movement of the piston 33 relative to the piston rod 32 to open the connection with the contact 82 and cause discontinuance of the flow of the welding current through the secondary 3. Continued upward movement induced by the spring 86 operates to separate the welding points from the work. The welder may be readily placed in position for a succeeding weld, the trigger operated, and almost immediately released. During the short interval of time in which the trigger is held down, the current which produces the weld flows only during the period in which a welding pressure is produced by the pressure means.

I claim:

1. In a welder, a transformer having a core, a primary coil located within the core, a secondary having laminated flexible end parts, a pair of semi-shell parts having overlapping edge portions for enclosing the transformer, one of the shell parts secured to the core and the other of the shell parts pivotally connected to the said one shell part, a pair of brackets removably connected to the shell parts, welding points connected to the brackets, means for connecting the flexible end parts of the secondary to the brackets, a piston connected to one shell part, and a cylinder connected to the other of the shell parts and operative to press the welding points against the work, a source of supply of air under pressure, a valve for connecting the cylinder to the source of supply of air under pressure.

2. In a welder, a transformer having a core, a primary located within the core, a pair of semi-shell parts having overlapping edge portions for enclosing the transformer, one of the shell parts secured to the core and the other of the shell parts pivotally connected to the said one shell part, welding points connected to the secondary, a cylinder connected to one of the shell parts and a piston connected to the other of the shell parts and operative to press the welding points against the work, a handle connected to the cylinder and extending along the side of the first named shell part, a valve located in the end part of the handle for controlling air under pressure to the cylinder, a second handle connected to the second named shell part and located on the side of the welder opposite to that on which the first named handle is located.

WILLIAM H. MARTIN.